_US011167382B2_

United States Patent
Wirth et al.

(10) Patent No.: US 11,167,382 B2
(45) Date of Patent: Nov. 9, 2021

(54) METHOD AND MACHINE EQUIPMENT FOR MANUFACTURING OF A CUTTING TOOL

(71) Applicant: Agathon AG, Maschinenfabrik, Bellach (CH)

(72) Inventors: Joachim Wirth, St. Gallen (CH); Jürg Marti, Solothurn (CH); Stephan Scholze, Birmensdorf (CH)

(73) Assignee: AGATHON AG, MASCHINENFABRIK, Bellach (CH)

( * ) Notice: Subject to any disclaimer, the term of this patent is extended or adjusted under 35 U.S.C. 154(b) by 643 days.

(21) Appl. No.: 16/127,941

(22) Filed: Sep. 11, 2018

(65) Prior Publication Data
US 2019/0084099 A1     Mar. 21, 2019

(30) Foreign Application Priority Data
Sep. 18, 2017   (CH) ..................................... 01147/17

(51) Int. Cl.
*B23P 15/34*     (2006.01)
*G05B 19/4097*     (2006.01)
(Continued)

(52) U.S. Cl.
CPC ............... *B23P 15/34* (2013.01); *B23P 15/28* (2013.01); *G05B 19/188* (2013.01);
(Continued)

(58) Field of Classification Search
CPC ........ B23P 15/34; B23P 15/28; G05B 19/188; G05B 19/401; G05B 19/4097;
(Continued)

(56) References Cited

U.S. PATENT DOCUMENTS 9,216,481 B1 * 12/2015 Zuzelo ................ B23D 61/025
10,357,837 B2 * 7/2019 Metelsky ................ B23P 19/04
(Continued)

FOREIGN PATENT DOCUMENTS

| EP | 2865468 A1 | 4/2015 |
| WO | 2015044681 A1 | 4/2015 |
| WO | 2016165577 A1 | 10/2016 |

OTHER PUBLICATIONS

International Search Report issued in corresponding Swiss Patent Application No. 1147/17 dated May 2, 2018, 8 pages.

*Primary Examiner* — Omar Flores Sanchez
(74) *Attorney, Agent, or Firm* — Pearne & Gordon LLP

(57) ABSTRACT

A method for multistep machining a cutting tool includes defining a data set of the cutting tool, positioning the workpiece in a machining device, determining a data set of the workpiece to be machined, defining at least one machining program based on the defined data set in relation to the determined data set of the workpiece, subjecting the workpiece to the at least one machining program, to obtain intermediate geometries of the workpiece, determining a second data set by measuring means including the intermediate geometries of the workpiece and transferring the machined workpiece to a second machining device. Furthermore, the steps of positioning, determining data set of the workpiece, defining machining program, subjecting the workpiece to the machining program, determining a second data set and transferring to the second machining device are repeated until the workpiece takes on the shape of the target geometries.

17 Claims, 2 Drawing Sheets

(51) Int. Cl.
*G05B 19/18* (2006.01)
*B23P 15/28* (2006.01)
*G05B 19/401* (2006.01)

(52) U.S. Cl.
CPC ....... *G05B 19/401* (2013.01); *G05B 19/4097* (2013.01); *G05B 2219/35159* (2013.01); *G05B 2219/36268* (2013.01); *G05B 2219/45149* (2013.01); *G05B 2219/50087* (2013.01)

(58) Field of Classification Search
CPC ........... G05B 2219/35159; G05B 2219/36268; G05B 2219/45149; G05B 2219/50087
See application file for complete search history.

(56) References Cited

U.S. PATENT DOCUMENTS

| | | | |
|---|---|---|---|
| 2004/0194528 A1* | 10/2004 | Biederman | B21J 9/00 72/404 |
| 2015/0025667 A1 | 1/2015 | Shindo et al. | |
| 2017/0355031 A1* | 12/2017 | Metelsky | B24B 3/06 |
| 2020/0206861 A1* | 7/2020 | Baur | G05B 19/401 |
| 2020/0218222 A1* | 7/2020 | Schneider | G05B 19/401 |
| 2021/0069847 A1* | 3/2021 | Yamada | B23Q 17/20 |
| 2021/0082126 A1* | 3/2021 | Yamada | H02P 21/18 |

* cited by examiner

METHOD AND MACHINE EQUIPMENT FOR MANUFACTURING OF A CUTTING TOOL

FIELD OF THE INVENTION

The present invention relates to a method for manufacturing of a cutting tool made of high hardness material and a machining equipment for performing the method. The cutting tool for instance for precision cutting includes a rake face, a flank face and a cutting edge formed of a ridge at a position at which these faces meet. This portion of the cutting tool is involved in cutting wherein at least this portion is made of a high hardness material. The method is a multistep method including at least one process for performing an external shape of the cutting tool, referred to as macroforming and at least one process for performing finishing, referred as microforming.

BACKGROUND OF THE INVENTION

The accurate production of cutting tools is difficult, in particular when cutting bodies consist at least partly of a very hard wear-resistant material, for example such as monocrystalline diamond (MCD), chemical vapor deposition diamond (CVD-PCD), polycrystalline diamond (PCD), cubic boron nitride (CBN), ceramics and cermet. These materials are applicable in many machining processes. Furthermore, a cutting tool can be structured as a sandwich element comprising for example a body made of carbide to which body a cutting tip made of polycrystalline diamante is connected.

A cutting tool, for example an indexable cutting insert, comprises at least a cutting edge of predetermined geometries and hardness to provide machining a workpiece. An indexable cutting insert are usually triangular, square, hexagon or dodecagon cutting inserts which have a cutting edge along the sides of the periphery of the indexable cutting insert. If a cutting edge is worn the indexable cutting insert can be rotated to present a fresh cutting edge. The cutting edge is subjected to high loads during a machining process, in particular a stock removal process, wherein the entire process energy is converted at the cutting edge leading for example to damage as micro bursts.

The cutting tool geometry in the region of the cutting edge can be designed such that the performance of the cutting process is increased. The position and form of the cutting edge and chip breaker as well as the roughness are important to provide a cutting tool with improved characteristic. In the case of precision tools, it is important that a highly accurate profile is attained. Due to the fact that machining accuracies of few micrometers are to be reached by means of the tool the appearance of an inaccurate production can lead to inadmissible tolerance deviations. Such cutting tools made at least partly of materials of high-hardness for precision machining are expensive and the finishing is time-consuming and cost-extensive.

Multistep methods for machining a cutting tool by removing material are well-known in prior art. Attempts are made in the past to minimize the complexity of the machining process or the number of process steps, the amount of investment and also machining times.

Generally, a process for manufacturing cutting tools comprises at least an operation for rough machining of a workpiece or blank and an operation for fine machining. During each operation steps for rough machining such as macromachining and fine machining or micromachining different machining methods can be applied.

A macroforming operation is employed to bring a workpiece or blank of cutting tool material into a prescribed shape, wherein the operation is performed conventional by grinding. But as the machining tool such as a grinding wheel or disc has to be in contact with the workpiece to be machined during the machining process the tool is submitted to heavy abrasive wear and the material removal is low. The life time of such a machining tool is shortened, thus resulting in increased manufacturing costs and machining times. Attempts are made to provide non-contact machining operations for the rough machining such as laser machining. Especially laser machining for roughly machining the workpiece is performed using operation parameters for high advance speed to form rough desired contour resulting in large material removal.

Depending on the laser used, laser machining can be seen as a heat generating process which is attributed to adsorption of laser beam in the workpiece. Therefore, the laser machining has the disadvantage in which the machining accuracy is unsatisfactory and particularly the smoothness of the machined surface can be of poor quality.

During fine machining operation different steps can be performed in which initially a step produces a significant material removal and further steps for finishing of geometry and surface structuring may be followed, for example using laser ablation with different operation parameters to obtain required surface qualities. But also machining with grinding or electrical discharge machining are well-known for the finishing operation. These tools can only be applied at areas of the workpiece where they can easily operate.

In general, methods for shaping a workpiece such as tools or tool inserts comprise proceeding operation steps. The machining procedure can be assumed to be realized by different machining equipment or machining devices, each of which is installed independently from each other. However, it is stated that the realization of independent equipment is unrealistic particularly from practical viewpoints, since every machining device needs at least a control equipment, a moving mechanism, a working table etc. causing unreasonable heavy economic costs and space. Furthermore, if machining devices are independently installed a single workpiece requires a fitting procedure independently as many times as the number of machining devices. Therefore, it is known that the workpiece remains in one clamping which can be transferred from one machining device to another.

Moreover, multistep manufacturing processes are known whereby a macromachining and a micromachining are performed in a hybrid machining device. Furthermore, a hybrid machining method for manufacturing a micromachined product from a workpiece comprises one first step for roughly machining a workpiece by subjecting the workpiece to an electromagnetic-wave-machining process and further subjecting the roughly machined workpiece to a cutting process such as a grinding process, wherein a shape of the workpiece is measured upon at least one of the steps. But such hybrid machining device are not flexible enough and complicated in handling.

DISCLOSURE OF THE INVENTION

It is therefore an object of the invention to overcome these problems of prior art. An object is to provide an efficient machining method as well as a device for carrying out the method wherein a process chain during the manufacturing is optimized in regard to lower consumption of high-cost tools and lower machining times to obtain a workpiece with a geometry and size fulfilling small tolerances.

In order to solve the above-identified problems, the present invention provides a method for manufacturing a cutting tool or in general a shaped workpiece, wherein the workpiece is subjected to a machining process chain.

The method for machining a cutting tool according to the invention is a multistep method, comprising the steps:

a) Defining a data set of the cutting tool comprising target geometries of the cutting tool, parameters of materials of the cutting tool and/or parameters of process operations for machining a workpiece into the cutting tool;

b) Positioning the workpiece in a machining device;

c) Determining a data set of the positioned workpiece to be machined by a measuring method comprising actually geometries of shape, positional and orientation data of the positioned workpiece;

d) Defining at least one machining program for the machining device based on the defined data set of the cutting tool in relation to the determined data set of the workpiece;

e) Subjecting the workpiece to the at least one machining program whereby obtaining intermediate geometries of the workpiece;

f) Determining a second data set of the workpiece by measuring means comprising the intermediate geometries of the workpiece;

g) Transferring the machined workpiece to a second machining device;

h) Repeating steps b) to g) until the workpiece takes on the shape of the target geometries.

The cutting tool can be provided as a one-piece tool such as an indexable cutting insert or can be a composite comprising a cutting insert connected to a body providing a cutting edge and/or a cutting tip. In particular the cutting tool is made at least partly of a material of high-hardness. Such a cutting tool can be used as a turning, drilling or milling tool.

The method according to the invention comprises an initial step wherein a data set is defined based on target geometries, also referred as desired or nominal geometries, of the finished cutting tool specified by the nominal shape or contour of the cutting tool. The data set, in particular the target geometries, are generated by using a set of parameterized templates or other methods to identify geometric feature characteristics in relation to a three-dimensional shape of the cutting tool for example on the basis of design data of the object. Design data, for example created by CAD, comprise geometry data identifying a final shape and a dimension of the workpiece after being machined in relation to coordinates. Based on identified geometric feature characteristics the method of the invention is adapted to choose a suitable machining program amongst for example stored processing procedures. The machining program is generated based on data in relation to features of the workpiece shape and also data in relation to machining methods such as a kind of tool and machining conditions. Furthermore, the data set of the cutting tool comprises parameters characterizing the material or materials of the workpiece or blank to be machined. The data set of the cutting tool further comprises information about machining processes to be performed at the workpiece to gradually shape the workpiece into the desired contour. The data set may comprise for example a machining or cutting mode and tool information in accordance with feature shape, a machining speed, etc.

In a following step the workpiece or blank to be machined is positioned in a machining device such that a machining operation with a first machining method can be performed. Positioning the workpiece can be such that optimal accessibility to the machining area or field for machining means is achieved. The blank can be positioned with respect to a geometric reference which is part of the machining device. Furthermore, clamping means can be used to fix the workpiece in a predetermined position to allow sufficient access.

For the positioned workpiece a data set is determined whereby the workpiece is measured to determine the shape thereof and to extract the position coordinates using a measuring method suitable for the machining method to be performed and a computing method. The measuring method varies depending on measuring means such as mechanical and/or optical means and on positioning means.

Measuring is related to a programming zero point representing an intersection point or origin of the x-, y- and z-axis of a coordinate system. The programming zero point is freely determined within the volume of the workpiece or on a surface of the workpiece. The comprised measuring means is adapted to generate positional information of the workpiece, in particular positional coordinates of characteristic points of interest of the surfaces or areas of the workpiece to be machined by said machining method in relation to the programming zero point. Furthermore, the positional information of the workpiece can be processed to define a virtual reference frame for example coordinates of a center-of-gravity position of the workpiece, symmetries or other geometrical or optical references which can be provided on the workpiece previously. Related to the generated positional information an orientation information of the workpiece positioned in the machining device can be extracted as well as information at least partly of the shape of the workpiece.

By associating the data set of the workpiece and the data set of the cutting tool a machining program can be defined performed in said machining device. The machining program is adapted to machine the positioned workpiece with a first machining method into geometries which may be the desired geometries or in a previous machining step which are intermediate geometries in the processing chain from the blank to the terminated cutting tool.

After machining the workpiece according to the generated machining program in said machining device another measuring step can be employed such that information about possible non-conformance of measured and to be achieved geometries of the machined workpiece in this process stage can be generated. Said information is related to coordinates referring to intermediate shape or contour of the workpiece and can be processed to instantiate an actual model of the workpiece in the intermediate stage. Said actual model of the workpiece can be applied to adjust the machining program of this machining device such that a closed-loop controlling is possible. Preferably, the method of the invention is adapted such that at least in one machining device a series of workpieces preferably combined in a batch are machined before the entire batch is transferred for successive machining.

Furthermore, said information about actual geometries can be compared to the cutting tool model of the finished cutting tool. Preferably, the instantiated actual model of the workpiece with intermediate shape can be a basis for further processing of the workpiece in another machining device. Therefore, the machining process chain is automatically and sequentially generated by the method of the invention based on determined data sets.

If the machining program is not adapted to provide the terminated cutting tool the workpiece or preferably the batch is transferred to another machining device wherein the workpiece can be subjected to a different machining method. Transferring the workpiece can be performed by hand, semi-automatic or fully automatic. The transferred workpiece is subjected to further machining steps whereby a new data set corresponding to the positional, orientation and shape information of the workpiece in the another machining device is determined. Herein another measuring method can be used which suits with the machining method to be performed.

The method according to the invention comprises a multistep machining process wherein the machining methods and the measuring methods used are selected such that an optimal machining process chain is possible to achieve a cutting tool within required tolerances.

According to the invention the machining process chain comprises at least one roughly machining step, also referred as a macroforming step, whereby the workpiece or blank is shaped by removal of material for example on all sides. The removal can be performed in short time and with high velocity. The machining step can include a laser processing, preferably with a short-pulse (ns) laser source. The laser processing can be performed such that a high-output, high-speed cutting laser is used to machine the workpiece into a roughly prescribed shape. Furthermore, the roughly shaping of the workpiece can include as well grinding and/or electric discharge machining.

To obtain a surface quality and a microshaped form of the cutting tool the method according to the invention comprises at least one microforming step such as laser processing preferably laser ablation, grinding and/or electrical discharge machining. This fine machining step smoothens the previously machined surface and can form determined surface geometries for example recesses and roundness at a cutting tip as desired.

According to an embodiment of the invention, the method for machining a cutting tool comprises determining positional coordinates of a reference point in particular a center-of-gravity of the workpiece positioned in a machining device. These positional coordinates are associated to the programming zero point of a coordinate system providing information about deviations of the programming zero point and the reference point such as the center-of-gravity of the workpiece. This information about deviations can be used to adjust the machining program to be performed in the machining device.

Therefore, the shape, the position and the orientation of the workpiece are determined for every machining step in each machining device and the generated data set is utilized for defining the machining program and/or for creating a correction machining based on the data set measured by measuring means related to the machining device and associated to the defined data set of the terminated cutting tool.

The method according to the invention offers the possibility to generate machining processes for manufacturing a cutting tool, wherein an operator does not have to input data in relation to the features of the workpiece shape as well as data in relation to the machining methods for every machining step. Therefore, the entire machining process can be performed in short times since the long period to input those data can be eliminated. Furthermore, the difficulties to completely prevent artificial input errors, whereby such problems that the workpiece is defective and/or machining tools are damaged are obviated.

The present invention provides a machining equipment for performing the method according to the invention, comprising:

At least one first machining means for roughing a workpiece;

At least one second machining means for finishing the workpiece;

Measurement means for measuring a shape of the workpiece and determining positional and orientation data of the workpiece, and A control means for controlling the first machining means and/or the second machining means based on determined data sets of the workpiece to be machined and the defined data set of the cutting tool.

The machining equipment for performing the method of the invention is provided such that a blank or workpiece is gradually takes on the shape of target geometries of the terminated cutting tool, wherein always known where and how much stock still remains on the workpiece. The machining process chain can include not only one macroforming step, but several and as well not only one microforming step but several, wherein each step can be performed by different or same machining methods.

Dependent on the actual machining means the workpiece to be machined is positioned wherein the workpiece is positioned in respect to a geometric reference. The workpiece can be accommodated in a loading prism or a clamping element.

Initially the workpiece or blank is roughly shaped via first machining means such as a grinding tool, a laser producing laser beam impulses and/or electrical discharge means such as a wire electrode. Preferably, the first machining means provides a macroforming step performed by laser machining which is an efficient, material saving machining method and has further advantages in relation to the well-known grinding, in particular grinding, since no liquid coolant and lubricant has to be provided and wherein only small material removal are possible. The contactless machining by a laser roughing process completely eliminates any tool wear and offers fully automation, flexible adaption to required geometries, low energy consumption and individual combination with other machining devices. For the roughing of the workpiece several machining means can be operated in series or in parallel.

Furthermore, the machining equipment comprises at least one second machining means for microforming or finishing the workpiece, in particular operated to achieve required surface qualities and/or microforms or fine structures. According to the invention, those second machining means are for example a grinding tool, a laser and/or an electrical discharge means. If the workpiece is shaped previously such that it is close to desired geometries only few dimensions of material has to be removed in order to achieve the required surface qualities. The finishing can be understood as a precision machining.

A combined machining process comprising the machining equipment reduces the finish machining effort and lowers the consumption for example of high-cost grinding tools.

According to the invention the machining equipment comprises measuring means. Said measuring means can be selected among mechanical means such as a probe or sensor and optical means such as an image device.

For example a probe operated to measure the shape of the workpiece may have the shape and geometry that substantially corresponds to the machining means that will be used in actual machining process. The probe can be moved preferably automatically in the direction of a point of interest on an area of the workpiece to be machined wherein the displacement of the probe is converted such that data representative of magnitude and direction of the probe displacement is generated. Based on said data coordinates representing the dimension of the workpiece can be determined in relation to a programming zero point and a model of the workpiece can be computed. Furthermore, by moving the probe along straight contour lines of the workpiece a data set can be generated and processed representing positional coordinates and information about the orientation of the workpiece.

The measuring means can employ imaging processing techniques for estimating the positional coordinates from captured projections. For this, the contour or shape of the workpiece is extracted from image data. The position of defined reference features such as straight lines of the contour can be used to compute the position and orientation of the workpiece. Optical means for measuring the shape of the workpiece such as an image device combined with lighting elements can provide pictures taken from at least one position which can be evaluated with respect to coordinates of characteristic points of interest of the surface of the workpiece. Examples of said optical means are CCD camera, infrared camera, near-infrared camera, laser scanner, laser triangulation, in particular in combination with laser scanner, microscope, interferometer and the like.

The machining equipment according to the invention further comprises a control unit for storing and controlling the data sets relevant for performing the method for manufacturing of a cutting tool. The control unit can comprise several individual control units, wherein several individual control units can be related for example to individual machining devices. The control unit is provided not only to control the actual operation but also is provided to control the actual operation in relation to the operations already performed. The control unit is adapted to change the machining program in particular to change program parameters such as machining conditions and offset of reference or zero points. The control unit is adapted to determine motions of a particular machine required to produce the desired path of the machining means and to generate the machining program needed to effect the desired path on the particular machining device in relation to the defined or determined data sets.

BRIEF DESCRIPTION OF THE DRAWINGS

The invention will be explained more closely in the following by way of example, with reference to the attached drawing in which.

DETAILED DESCRIPTION OF THE DRAWING

Figure 1:
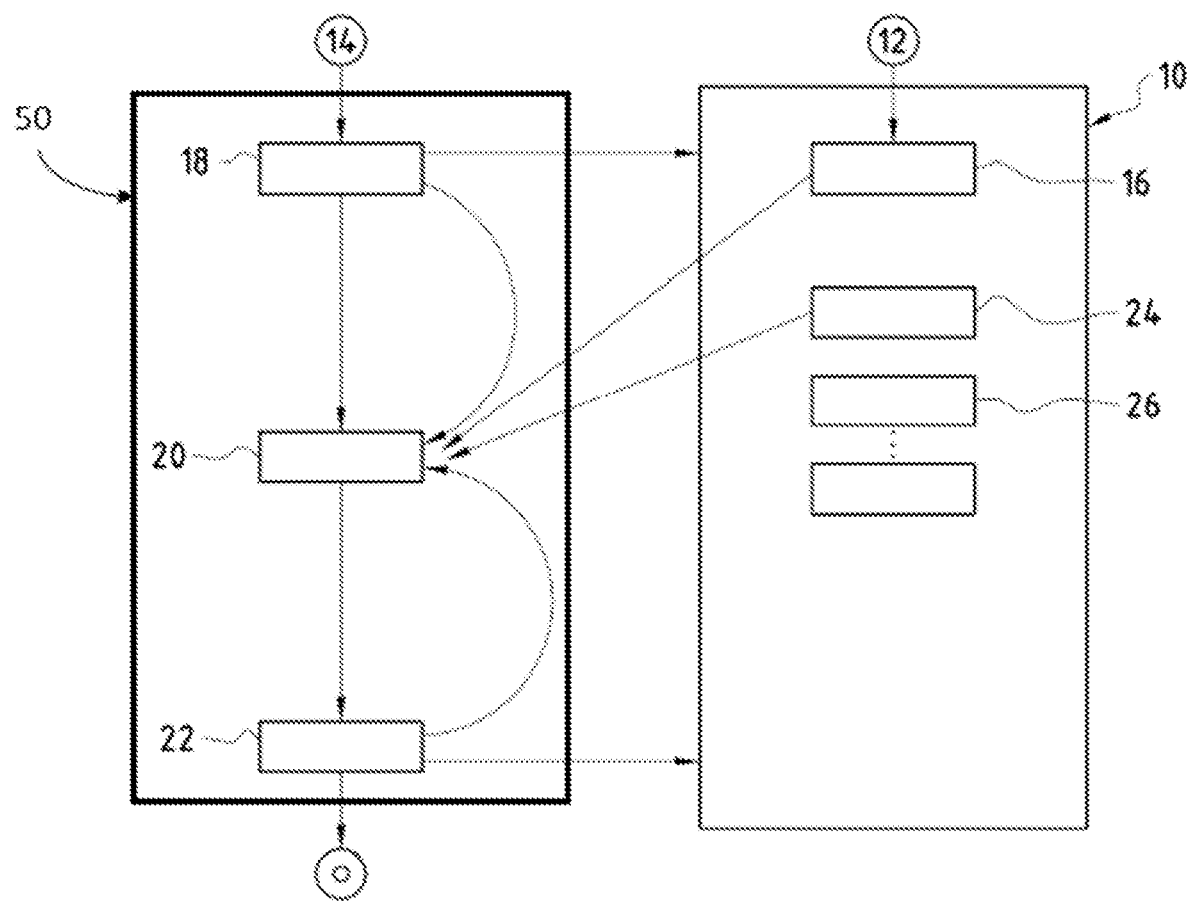
FIG. 1 shows a block scheme of the method according of the invention.

The method for manufacturing of a cutting tool will be described with reference to FIG. 1. FIG. 1 is a block scheme showing main elements of the method according to a preferred embodiment of the invention. In FIG. 1, a control unit 10 is adapted to receive a data set 12 defining target geometries of a cutting tool to be manufactured, including design data indicating a final shape and dimensions of the cutting tool as well as data of finished surface qualities. Furthermore, information of material of the cutting tool and further information related to parameters of process operations to take a workpiece 14 into a shape of the finished cutting tool are stored. Said data set 12 can be stored in a data storage 16, wherein the geometry data, feature data, machining means data, material data and further relevant data can be stored as well in separate data storages comprised in the control unit 10. The control unit 10 is a functioning unit to store data in relation to the target cutting tool and in relation to the workpiece 14. The data set 12 is inputted through an on-line processing or in other appropriate way in the control unit 10. Furthermore, the control unit 10 can comprise individual control units such as decentral control units.

The workpiece 14 is positioned into a machining device 50 in an appropriate way depending on the type of machining method performed by said machining device. The workpiece 14 to be machined can be referred as a blank which in step 18 is subjected to a measurement method to generate data necessary to generate a machining program to be performed in said machining device. The data set comprises at least geometry data of the workpiece 14 and is transmitted to the control unit 10, indicated by an arrow in FIG. 1. In a step 24, based on the geometry data, the control unit 10 generates a machining program to be performed in step 20. According to the invention, the measuring in step 18 is performed with the workpiece 14 positioned in said machining device, in particular in initially machining steps in a machining device for macroforming. The measuring of the workpiece 14 further gives information about the position of the workpiece 14 in the machining device and the orientation thereof.

After subjecting the workpiece 14 to a machining process in particular the macroforming step 20 the machined workpiece 14 is again subjected to measuring in step 22, for example by laser scanning to generate a data set of the intermediate geometry of the workpiece 14 which is transmitted to the control unit 10, indicated by an arrow in FIG. 1. The extracted geometry data can be computed such to instantiate an actual model of the workpiece 14 in that process stage. Said actual model can be set in relation to the data set 12 of the finished cutting tool to generate a machining program for the following process steps 26, etc.

As indicated by connection lines the determined data sets before and after machining of the workpiece 14 in step 20 each can be processed to control a machining program applied in step 20 wherein the machining program is further controlled by the defined data set 12 of the target cutting tool stored in the control storage 16 of the control unit 10.

Since the method according to the invention is a multistep process the workpiece 14 is subjected to further machining processes. Each successive machining process can be performed comparable to the previously described program, starting by a measuring step 18, subjecting the workpiece to machining 20 in a machining device and another measuring step 22. The process steps comprises at least one macroforming process, indicated by 24 and at least one microforming process, indicated by 26. Said program is controlled by the control unit 10 and provides a closed-loop control for the performed machining process. The process chain is indicated in FIG. 1 by blocks 24, 26. The successive machining steps can be performed in another machining device wherein transferring and positioning of the workpiece is included. At the end a cutting tool with desired geometries and qualities is manufactured.

Figure 2:
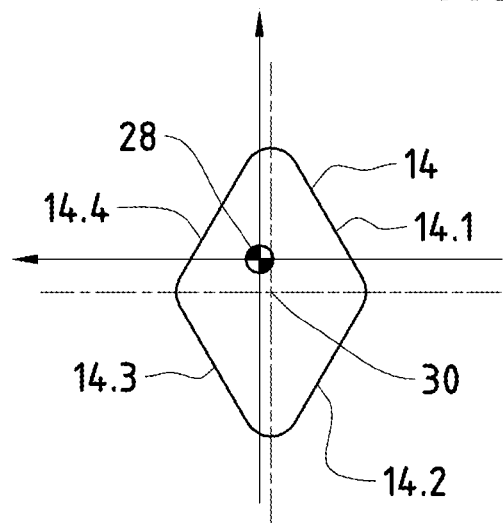
FIG. 2 is a schematic view of a workpiece showing a programming zero point and another reference point.

FIG. 2 shows a schematic workpiece 14 which can be in the form of a rhombus with sides 14.1, 14.2, 14.3 and 14.4. FIG. 2 shows the workpiece 14 in plan view. According to the method of the invention, the shape and dimensions of the workpiece 14 is determined in step 18 previous each machining step 20 wherein appropriate measuring method is provided. Initially, a programming zero point 28 is defined in particular by an operator, wherein taking into account target geometries of the cutting tool. The programming zero point 28 is set in the volume of the workpiece 14 or on a surface of the workpiece 14. According to the invention, the programming zero point 28 can be seen as an origin of a coordinate system, crosspoint of coordinate axis, in particular the three coordinate axis x, y and z representing the three space directions. As can be seen in FIG. 2, the programming zero point 28 can differ from a reference point 30. In the embodiment shown in FIG. 2, the reference point 30 represents a center-of-gravity of the workpiece 14 but can be also every other suitable reference point 30. The reference point 30 is generated on the base of the measured geometry coordinates of the workpiece 14. This can be done based on measurements via optical means of an imaging proceeding technique wherein positions of the four sides 14.1, 14.2, 14.3, 14.4 of the workpiece 14 are determined.

Figure 3:
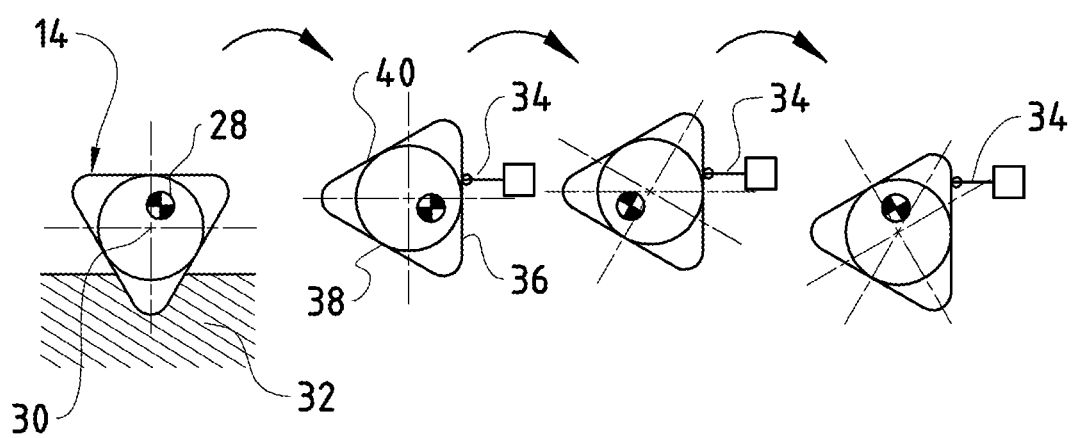
FIG. 3 shows schematically a process for measuring a shape of a workpiece.

Referring to FIG. 3, the workpiece 14 has in the shown embodiment a triangular form and is positioned in a loading prism 32 in relation to a machining device. As can be seen, the programming zero point 28 differs from the reference point 30.

According to one embodiment of the invention, one measurement method is based on a probe 34 to measure shape, dimensions and/or other parameters such as straight lines of the workpiece 14 relevant for the method of the invention and further to determine the reference point 30. The probe 34 can be displaced automatically towards the workpiece 14, in particular towards the surfaces 36, 38, 40 of the workpiece 14 wherein directions and displacements of the probe 34 can be processed to generate geometry coordinates of the surfaces 36, 38, 40 of the workpiece 14 related to the programming zero point 28. Based on the geometry, coordinates of the surfaces 36, 38, 40 of the workpiece 14 which are related to the programming zero point 28 coordinates of the reference point 30 can be extracted and deviations based on coordinates can be defined. Deviations of the programming zero point 28 to the reference point 30 are used for the machining program in particular to effect a machining path of a tool required to produce the desired path with high accuracy.

The invention claimed is:

1. Method for multistep machining a cutting tool, comprising the steps:
   a) Defining a data set of the cutting tool comprising target geometries of the cutting tool, parameters of materials of the cutting tool and/or parameters of process operations for machining a workpiece into the cutting tool;
   b) Positioning the workpiece in a machining device;
   c) Determining a data set of the positioned workpiece to be machined by a measuring method comprising actual geometries of shape, positional and orientation data of the positioned workpiece;
   d) Defining at least one machining program for the machining device based on the defined data set of the cutting tool in relation to the determined data set of the positioned workpiece and/or a second data set of the workpiece;
   e) Subjecting the workpiece to the at least one machining program;
   f) Measuring the workpiece by measuring means to determine the second data set of the workpiece comprising intermediate geometries of the workpiece;
   g) Processing the second data set of the workpiece to instantiate an actual model of the workpiece with the intermediate geometries of the workpiece and using the actual model of the workpiece to adjust the machining program of the machining device;
   h) Transferring the machined workpiece to another machining device;
   i) Repeating steps b) to h) until the workpiece takes on the shape of the target geometries.

2. Method according to claim 1, wherein the actual model of the workpiece with intermediate geometries is usable for further processing of the workpiece in another machining device.

3. Method according claim 1, wherein the method comprises at least one rough machining step and at least one fine machining step.

4. Method according to claim 3, wherein the at least one rough machining step is selected from the group consisting of laser processing, grinding and electrical discharge machining.

5. Method according to claim 3, wherein the at least one fine machining step is selected from the group consisting of laser processing, grinding and electric discharge machining.

6. Method according to claim 1, wherein the measuring method to define the data set of the workpiece to be machined depends on the machining method to be performed.

7. Method according to claim 6, wherein the measuring method is a mechanical and/or optical method.

8. Method according to claim 1, wherein the data set of the workpiece defined in step c) comprises positional coordinates of machining fields related to a programming zero point determined within the workpiece.

9. Method according to claim 8, wherein positional coordinates of at least one reference point related to the workpiece and deviations of the programming zero point to the at least reference point of the workpiece are determined.

10. Method according to claim 9, wherein the at least one reference point is a center-of-gravity of the workpiece.

11. Method according to claim 9, wherein the machining program of step d) is adjusted according to the determined deviations of the programming zero point to the at least one reference point.

12. Method according to claim 1, wherein the target geometries of the cutting tool are generated from a set of parametrized templates.

13. A machining equipment for performing the method for multistep machining a cutting tool according to claim 1, comprising:
   At least one first machining means for roughing a workpiece;
   At least one second machining means for finishing the workpiece;
   Measurement means for measuring a shape of the workpiece and determining positional and orientation data of the workpiece, and
   A control means for controlling the first machining means and/or the second machining means based on determined data sets of the workpiece to be machined and the defined data set of the cutting tool.

14. Machining equipment according to claim 13, wherein the measuring means comprises imaging means.

15. Machining equipment according to claim 13, wherein the measuring means comprises a probe.

16. Machining equipment according to claim 13, wherein the workpiece to be machined is positioned such to be machined by the first and/or second machining means in a loading prism.

17. Machining equipment according to claim 14, said imaging means comprising at least one of the following: CCD camera, infrared camera, near-infrared camera, laser scanner, laser triangulation, microscope, and/or interferometer.

* * * * *